MULTI-CELL ELECTRODIALYSIS APPARATUS HAVING RESILIENT SPACERS
Filed July 1, 1964 4 Sheets-Sheet 1
FIG. 1
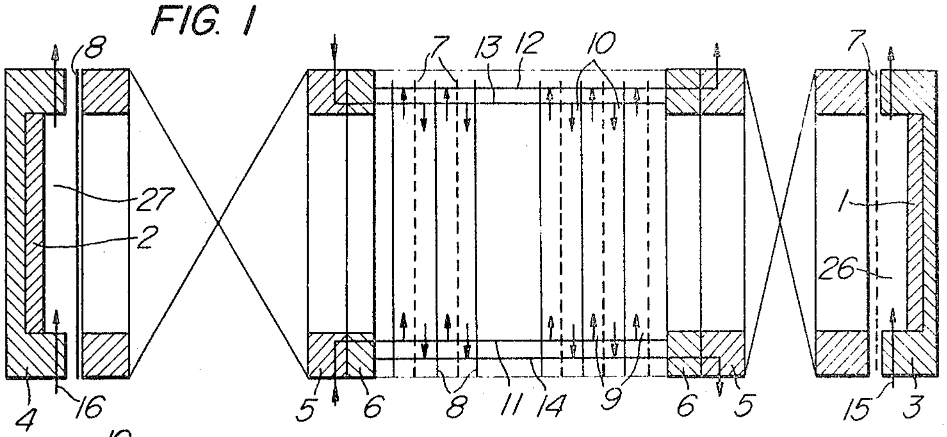
FIG. 2
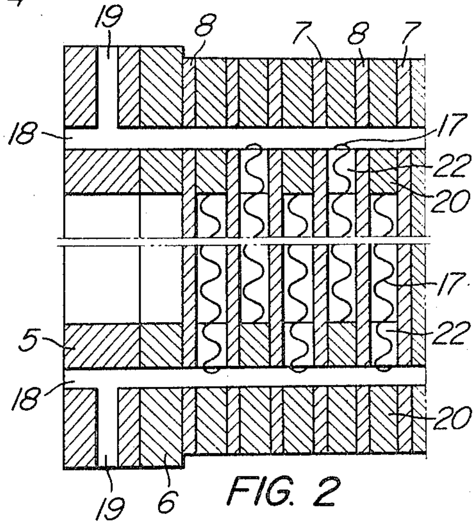
FIG. 5-a
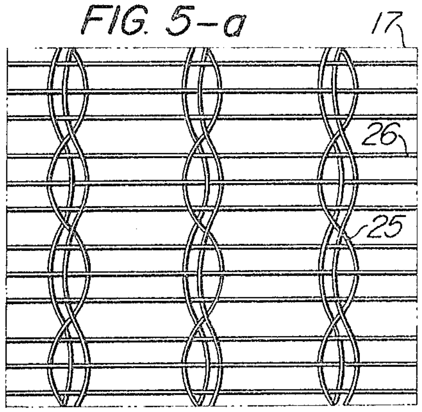
FIG. 5-b
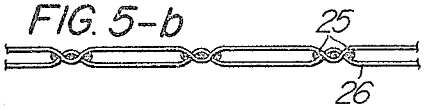
Yoshio Tsunoda,
Naomi Seko,
Kazuyuki Fuzita and
Masaaki Watanabe, INVENTORS
BY Wenderoth, Lind
and Ponack ATTORNEYS Yoshio Tsunoda,
Maomi Seko,
Kazuyuki Fuzita and
Masaaki Watanabe,
INVENTORS BY Wenderoth, Lind and Ponack
ATTORNEYS Yoshio Tsunoda,
Naomi Seko,
and Kazuyuki Fujita
Masaaki Watanabe INVENTORS BY Wenderoth, Lind
and Ponack, ATTORNEYS Yoshio Tsunoda,
Naomi Seko,
Kazuyuki Fuzita INVENTORS
and Masaaki Watanabe BY Wenderoth, Lind
and Ponack ATTORNEYS 3,284,335

MULTI-CELL ELECTRODIALYSIS APPARATUS HAVING RESILIENT SPACERS

Yoshio Tsunoda, Tokyo, and Maomi Seko, Kazuyuki Fuzita, and Masaaki Watanabe, Nobeoka-shi, Japan, assignors to Asahi Kasei Kogyo Kabushiki Kaisha, Osaka, Japan, a corporation of Japan Filed July 1, 1964, Ser. No. 379,559
Claims priority, application Japan, Aug. 25, 1960, 35/35,744
10 Claims. (Cl. 204—301)

This application is a continuation-in-part of application Serial No. 55,433, now abandoned, filed September 12, 1960.

This invention relates to electrodialysis apparatus and more particularly multi-cell electrodialysis apparatus comprising a plurality of anion permeable membranes, cation-permeable membranes and frames.

The use of an electrodialysis apparatus which includes selectively anionpermeable resin membranes and selectively cation-permeable resin membranes alternately placed so as to form concentrating chambers and diluting chambers in alternate alignment for attempting to desalt or concentrate an electrolyte solution or to separate more than two materials is well known. In general, however, it requires great-skill and considerable time to assemble or dismantle a stack of membranes which form such an apparatus because of the complexity of its construction. For instance, the apparatus disclosed in U.S. Patent No. 2,758,083, is constructed by assembling together ion exchange resin membranes having holes therethrough forming conduits for the solution to be treated in the apparatus, square-shaped elastic frames which are located between the membranes and which support the rim of the membranes outside the said holes, spacing members and rigid plates arranged around the holes in order to define flow paths for the solution from the conduits to the chambers between the membranes.

In such apparatus considerable effort and skill are required for assembling or dismantling the apparatus, because there are so many different kinds of parts required to form the frame and to define the flow paths for the solution. As to the reason why such a construction should be employed, it is alleged that a sufficiently small distance between membranes cannot be maintained by utilizing frames having holes for the said conduits.

It is an obeject of this invention to provide an improved apparatus of this type.

According to this invention, there is provided a multi-cell electrodialysis apparatus comprising a stack of a plurality of alternate anion permeable membranes and cation permeable membranes having frames interposed therebetween the internal periphery of each of which frames defines an electrodialysis area or chamber, diluting and concentrating chambers alternating through the stack, both the membranes and frames having holes in the peripheries thereof to form supply and exhaust conduits for carrying both a diluting and a concentrating solution through the stack, the frames each having solution paths between the holes and the electrodialysis chambers so as to provide, in a diluting chamber, communication only between the electrodialysis chamber and the supply and exhaust conduits for the diluting solution and in a concentrating chamber only between the electrodialysis chamber and the supply and exhaust conduits for the concentrating solution. In the construction according to the invention, at least one of said solution paths is formed by cutting away or omitting part of the appropriate frame, and a porous compressible spacer woven of a water and chemical resistant fiber having an unstressed thickness at least slightly greater than that of said frames and a stressed thickness the same as that of said frames is located in said solution path, and a like spacer is located in the associated chamber. Alternatively, a single such spacer is provided, a portion of said spacer being located in at least a part of said solution path and a portion being located in the associated chamber.

This apparatus has the advantage that, because of the inter-position of the spacers in the solution paths, the membranes between frames are unable to bow into those parts of the adjacent frames which have been cut away to form the solution paths. Thus leaking of one of the solutions into the other is reduced or eliminated.

Since each frame used in the apparatus according to this invention is provided not only with holes for the conduits for supplying or discharging solution, but also has the solution-paths provided in the frame, a stack can easily be assembled by an unskilled person by alternately stacking frames and membranes with spacers interposed therebetween.

Further, in the apparatus of the present invention, leakage of solutions between the concentrating chambers and diluting chambers is prevented since a unique solution path is provided for the flow path between either the dilution chamber or the concentrating chamber and its supply or discharge conduit.

Furthermore, in the present invention, because a stack can be assembled by using only three kinds of units, i.e., selectively ion-permeable membranes, frames and spacers, small inter-membrane distances can be obtained, and a uniform distribution of the solution in each chamber can be obtained by supplying and discharging the solution through the conduits in the peripheral part of the membrane. This prevents the polarization of the solution and deposition of scale during operation of the apparatus.

According to a further feature, each spacer is a porous spacer of a bulky fabric woven of a water resistant fiber. In order to enhance the effect of reduction of leakage, it is preferred to incorporate the feature described in our copending application Serial Number 55,379, filed September 12, 1960, in the apparatus of this invention. To this end, one or more of said solution paths has at least one sharp bend therein, the radius of curvature of which is substantially zero and which is less than 5 mm. wide.

In order that this invention may more readily be understood, reference will now be made to the accompanying drawings in which are shown several preferred embodiments of the invention, and in which:

FIGURE 1 is a schematic sectional view of one embodiment of a multi-cell electrodialysis apparatus according to the present invention, the arrows indicating the direction of flow;

FIGURE 2 is a sectional side elevation of a stack of membranes, frames and spacers taken along line I—I' in FIGURE 3 and the line II—II' in FIGURE 4;

Figures 6, 9, 10:
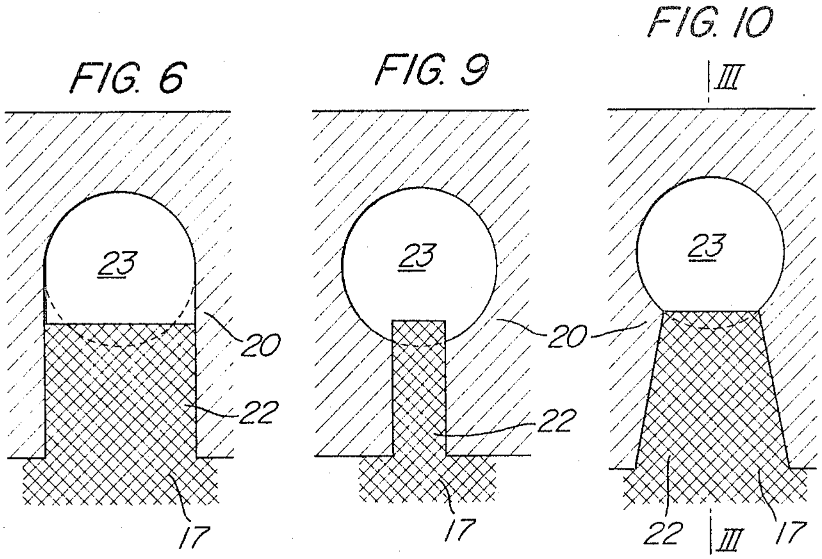
Figures 7, 8:
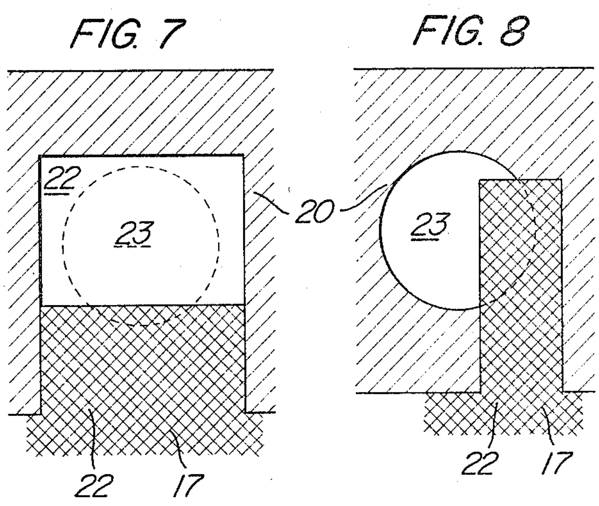
Figure 11:
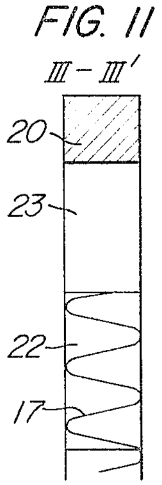
Figure 12:
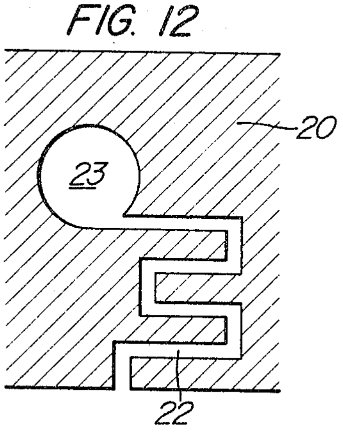
Figure 13:
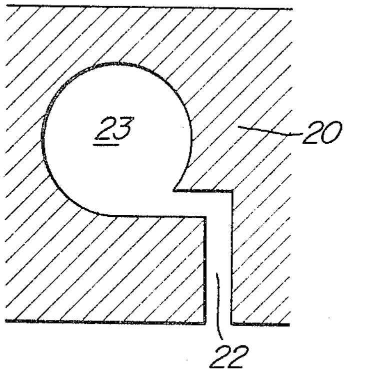
Figure 14:
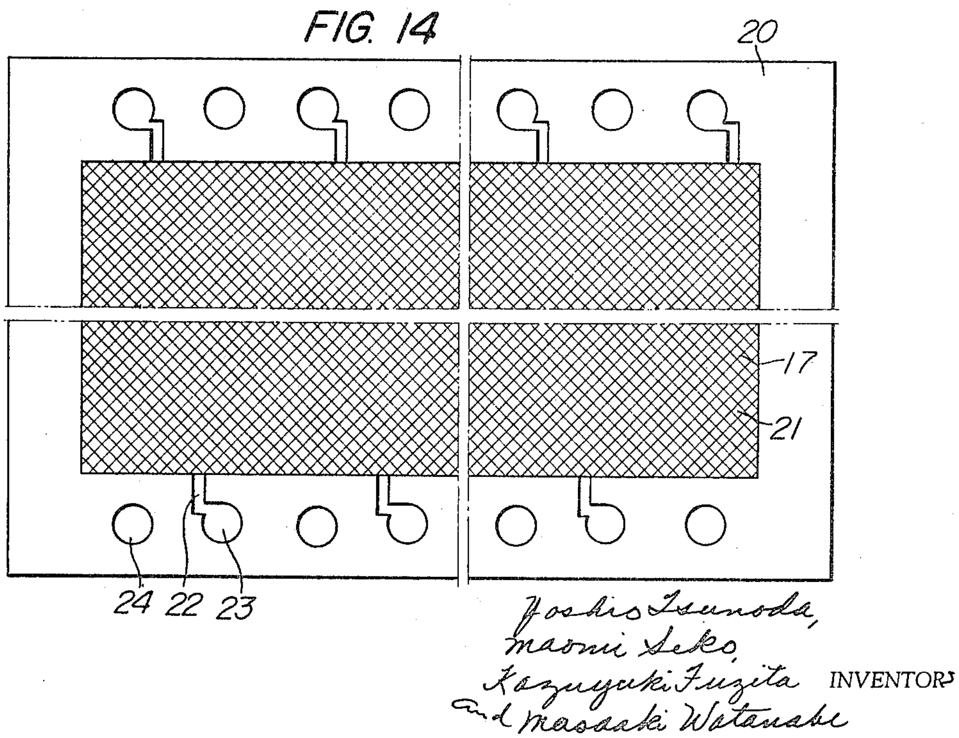

FIGURES *5a* and *5b* are respectively a plan view and a side elevation of a spacer made of a highly porous fiber;

FIGURES 6 to 10 are fragmentary plan views of frames with spacers therein and illustrating forms of holes through the peripheral parts of such frames which form conduits for supplying or discharging concentrating solution or diluting solution, and solution salts through which one of the solutions is supplied to, or discharged from, the chamber within the frame;

FIGURE 11 is a cross-sectional view taken along the line III—III' of FIGURE 10;

FIGURES 12 and 13 are plan views of parts of frames showing examples of solution-paths; and FIGURE 14 is a plan view of another embodiment of the frames and spacers of the apparatus.

Referring to the drawings, in FIGURE 1 there is shown a cathode chamber 26 having a cathode 1 therein and defined by a cathode frame 3 in which the cathode is accommodated. A cation-selective permeable membrane 7 is located in front of the cathode. At the other end of the apparatus is an anode chamber frame 4 defining anode chamber 27 in which an anode 2 is accommodated, and an anion-selective permeable membrane 8 is located in front of the anode 2. The anode frame and cathode frame are made of, or coated with, electrically insulating materials. Between the anode and cathode chambers are one or more stacks fastened by two fastening frames 6 interposed between feeding frames 5. Arrows 15 and 16 respectively show the flow of liquid streams in the cathode chamber 26 and the anode chamber 27 for removing materials which are produced by the respective electrode reactions during dialysis, e.g., chlorine, hydrogen, sodium hydroxide, etc.

In FIGURE 1, each stack, here located in the middle of FIGURE 1, comprises a plurality of alternate diluting chambers 9 and concentrating chambers 10 separated by alternate selectively anion-permeable resin membranes 7 and cation-permeable resin membranes 8. Solution is supplied to each of the diluting chambers 9 simultaneously, usually from the bottom portion of the chamber, through one or more conduits 11 interconnecting the individual diluting chambers, and discharge of solution is usually from the top portion of the chamber through one or more conduits 12 interconnecting the individual diluting chambers. Similarly, a solution to be concentrated is supplied to each of the concentrating chambers 10, usually from the top part of the chamber, through one or more conduits 13 interconnecting the individual concentrating chambers, and a solution is discharged from the bottom of said chamber through one or more conduits 14 interconnecting the individual concentrating chambers.

Figure 3:
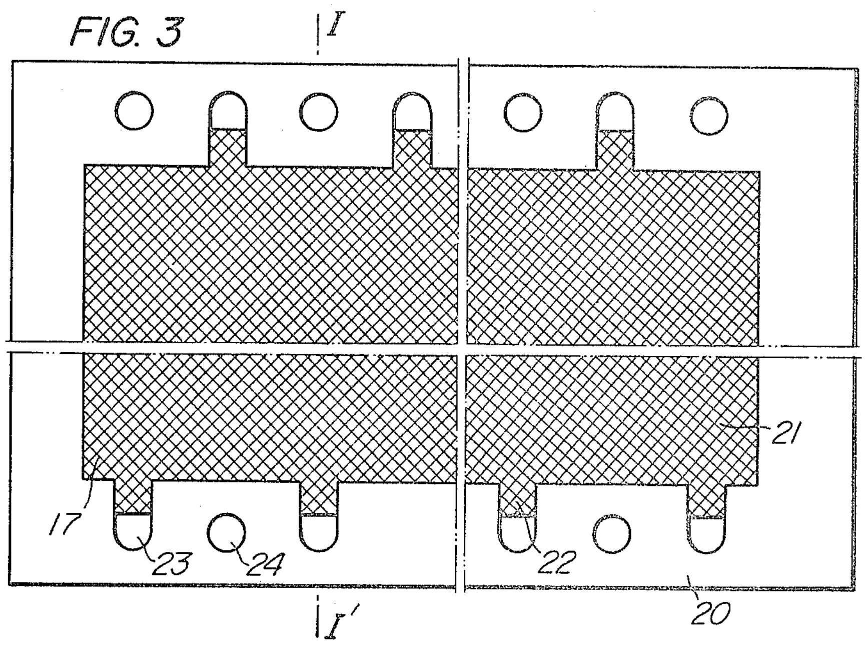
FIGURES 3 and 4 are plan views of an example of the frames of the apparatus with the spacers therein.
Figure 4:
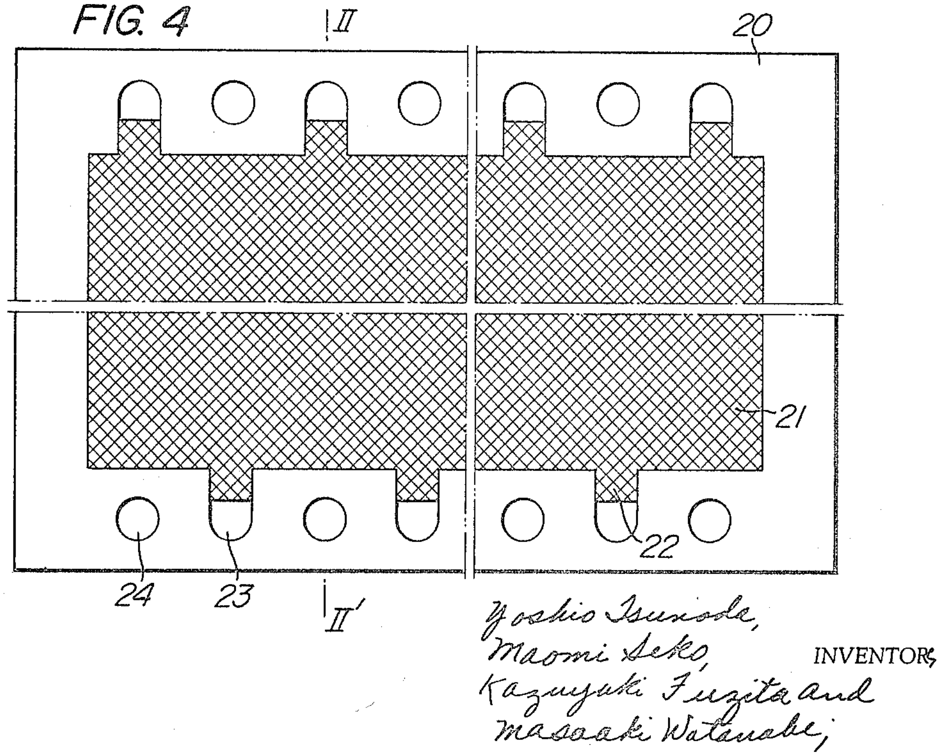

FIGURES 3 and 4 show a pair of frames for adjacent diluting and concentrating chambers. In the upper and lower peripheral parts of the selectively ion-permeable resin membranes 7 and 8, and in the frames there are provided at least four holes 23 and 24 which, when aligned with corresponding holes in the other frames in the stack, constitute the conduits 11, 12, 13 and 14. The frame of FIGURE 3 (hereinafter referred to as frame A) and the frame of FIGURE 4 (hereinafter referred to as frame B) have the same number of holes at mutually corresponding positions. A solution path 22, shown in FIGURES 3 and 4 is provided by cutting away a part of the frame between a hole 23 and the concentrating or diluting chamber and by inserting a spacer in at least a part of the area formed by cutting away the frame. This is one example of solution-path which may be used in the apparatus according to this invention. For convenience, these figures show an embodiment in which both the frames A and B have similarly shaped solution-paths.

Thus, while both the holes 23 and 24 are present in each frame, the hole 24 has no solution-path, whereas the hole 23 has the solution-path 22. The cross-hatched parts show the spacers. In the frame B, the holes 24 and 23 are reversed with respect to those of the frame A, so that the holes 23 of frame A are in the positions corresponding with holes 24 in frame B and vice versa. Also on the selectively cation-permeable resin membrane 7 and the selectively anion-permeable resin membrane 8, holes with the same, or approximately the same, diameter as those of the frames are perforated at positions corresponding to those on the frames.

FIGURES *5a* and *5b* show a spacer 17 woven yarns or filamentary material, this weave being sufficiently open for liquid to flow through the spacer. Water and chemically-resistant hard fibers, e.g. fibers of materials sold under the registered trademark "Saran" or poly-vinyl chloride fiber or other organic or inorganic high molecular polymeric fibers can be conveniently used. The existence of a spacer permits the uniform flow of a solution in any direction so as to avoid the local decrease of the concentration in an electrodialysis area. The spacer is placed in at least a part of the solution path or can be arranged in the electrodialysis area 21 and extend into at least a part of the solution-path and also into a part of the conduit 23 in most cases. The spacer also serves to prevent the contact of adjacent membranes and to keep inter-membrane distance constant throughout, in both the diluting and the concentrating chambers. It also gives rise to enough turbulent flow to disturb the streams within each of the chambers as much as possible. The gauze-like texture of the spacers is shown in the figures, FIGURE *5a* being a view taken in the direction of the electric current and FIGURE *5b* being a section taken in the direction of the liquid stream perpendicular to the electric current direction. Warp yarns or filaments 25 and weft yarns or filaments 26 are woven so as to provide sufficient space for flow of liquid through the spacer, the weft yarns undulating between the upper and lower faces of the spacer, while the warp yarns or filaments are twisted together to give sufficient thickness to the spacer. Preferably the spacer is woven from monofilaments.

When the frame A, the frame B, the selectively cation-permeable resin membrane 7, the selectively anion-permeable resin membrane 8, and spacers 17 are assembled in the sequence 8, A, 17, 7, B and 17, in the direction from anode to cathode as shown in FIGURE 2, the conduits 11, 12, 13 and 14 are formed by the holes 23 and 24. Holes 18 are also provided in the corresponding places in the fastening frames 6 and the feeding frames 5.

Between the two fastening frames 6, the selectively cation-permeable resin membranes 7, the selectively anion-permeable resin membranes 8, the frames A, the frames B and the spacers 17 are assembled in the predetermined sequence set forth above so as to form alternate diluting chambers and concentrating chambers, and the whole assembly is tightly fastened by the fastening frames and assembled between two feeding frames 5 (only one frame being shown in FIGURE 2). All assemblies are fastened by a press at a suitable pressure depending on the material of the frame 20. Since the solution path for each chamber is provided between the chamber and the appropriate conduit, the solution in one chamber is independent of and unable to mix with the solution in the adjacent chambers. Because the spacers are present in the solution paths, the resin membranes cannot bend in the region of the solution paths and do not permit leakage between chambers even when the solution paths are comparatively wide. Furthermore, as a spacer is present in each chamber, the spacer ensures that the distance between membranes remains constant in the electro-dialysing area. Moreover, constant resistance to flow is maintained throughout each chamber.

A hole 19 is provided in the feeding frame 5 perpendicular to the hole 18 for each conduit for each supply and discharge conduit as shown in FIGURE 2, and the supply and discharge of concentrating and diluting solution to and from the stack is effected through the holes 19.

One stack can comprise a large number of pairs of membranes, and, between the cathode and anode, one or more stacks may be interposed. This modification of the present invention will be explained further in detail.

The supply or discharge of the concentrating solution or diluting solution to and from the individual stacks placed between cathode 1 and anode 2 may be made, as seen in FIGURE 2, separately through the holes 19 by closing the ends of the holes 18. Alternatively, when more than two stacks are joined, it is also possible to supply or discharge the solutions to and from the stacks from one common feeding frame through extended ducts formed by leaving the holes 18 open and closing the holes 19, so that the individual stacks form one big stack. In FIGURE 1, the dilution stream flows upwardly from the lower part of the chamber 9, and the concentration stream flows downwardly from the upper part of the concentrating chamber 10. Of course, several other methods of operation are possible including downward flow in the diluting chamber 9 and upward flow in the concentrating chamber, or upward or downward flow in both the concentrating and diluting chambers. In FIGURE 1, the supply of the concentrating solution and the diluting solution is effected through the feeding frame at the anode side and the discharge of said solutions is effected through the feeding frame at the cathode side. It is also possible, however, to supply both the concentrating and diluting solutions through the feeding frame at the cathode side, and discharge said solutions through the feeding frame at the anode side, or to supply either of the two from the anode side and to discharge it from the cathode side, while the other is supplied from the cathode side and discharged from the anode side.

The holes forming the conduits in the frames and membranes can be provided at any peripheral part of the frames, e.g. upper and lower portions or left and right portions, but preferably they are provided in the upper and lower sides of the frames. Usually the holes which form the conduits for supplying or discharging the diluting solution and those which form the conduits for supplying or discharging the concentrating solution are disposed alternately in the peripheral part of the frame. The holes for supplying or discharging the diluting solution and those for supplying or discharging the concentrating solution can have equal or different diameters. Further, on the one side of the frame, the number of the diluting solution supplying or discharging holes can be the same or different as the number of concentrating solution supplying or discharging holes.

The pitch between neighbouring holes is preferably less than 30 cm. Further, a line which connects the centers of the individual holes for supplying or discharging the concentrating solution and that which connects the centers of the individual holes for supplying or discharging the diluting solution can be the same or different. The holes of the membranes are concentric with the holes at the corresponding positions of the frame and these holes can be the same or different in diameter.

The frames used in the present invention can be made of an elastic material, e.g. natural rubber, synthetic rubber, polythenes, polystyrene resin, polyester resin, urea and melamine resin, polyvinyl chloride resin, polyacrylic resin, polyamide resin, polyurethane resin, etc., but, natural rubber and synthetic rubbers are preferred in view of the less permanent deformation thereof by compression.

The shape of the solution path in the apparatus according to this invention is a simple one and is formed by cutting away a part of the frame between the holes and the chamber within the frame. It is preferred to employ a shape such that the solution path in the frame A does not register with the solution path in the frame B when the frames A and B are stacked.

Several examples of shapes of solution paths which can be used in the apparatus of this invention are shown in plan view in FIGURES 6 to 10, while FIGURE 11 is a sectional view of the solution path shown in FIGURE 10.

The cross-hatched part of the solution paths in FIGURES 6 to 10 is the part in which the spacer is present, the solution path extends through the frame between at least a part of the edge of the hole and the chamber, and in some cases the width of the solution path is equal to the diameter of the hole. The width of solution path is preferably constant, but can be varied. Usually the width of the solution path is in the range of 5 to 60 mm.

The spacer which is interposed between selectively ion-permeable resin membranes, is present not only in the electrodialysis area but also in part of the solution path. Usually, it is also present in a part of the area of the hole 23.

The spacers used for the diluting chambers and the concentrating chambers can be the same or different types. There are also some cases where two or more spacers can be used at one time in one cell and the direction of weaving can be different.

The spacer is illustrated in FIGURE 5 is bulky and when pressure is applied on both sides of the fabric, its thickness will be reduced in proportion to the amount of pressure applied, and at the same time, the spacer is in close contact with the membranes on opposite sides of it. When the applied pressure is removed, the spacer regains its original shape and thickness.

However, the spacer must have an unstressed thickness at least slightly greater than that of the frame. Further, where two or more spacers are overlapped in the solution path, the total thickness of the overlapped spacers must be at least slightly greater than that of the frame.

When, therefore, the stacks are assembled the spacers are compressed by the two fastening frames until the thickness of spacers becomes the same as that of the frames, the spacers thereby pressing with uniform force on adjacent membranes. Thus the leakage from the solution path and damage to the membranes will be considerably reduced or eliminated. For this reason, the solution path can be widened and the pressure loss during the flow of the solution can be reduced accordingly.

The spacers in the electrodialysis area 21 and in the solution path can be a continuous single body.

The forms of solution path which have been illustrated can be used as solution paths either for the concentrating or for the diluting chambers. In FIGURES 3 and 4, the frames A and B defining the diluting and concentrating chambers have the same type of solution path, but these frames can have different types of solution paths. Where solution paths of different shapes are used, the solution path which carries the lesser amount of solution would be that having the narrower width.

When a solution path having one of the forms shown in FIGURE 6 to 10 is used in one of the frames A and B, a solution path of any of the shapes illustrated can be used in the other frame. FIGURES 12 and 13 show typical examples of a frame having a solution path which is formed by cutting out a part of the frame between the hole 23 and the electrodialysis are 21 and which solution path has a narrow width and at least one bend. Alternatively, the bent solution path may be defined by a thin elastic sheet on which small projections of a size corresponding to inter-membrane distance are positioned which sheet is located in an opening in the frame between the hole and the electrodialysis area.

Because the solution paths shown in FIGURES 12 and 13 are narrow and have bends therein, the ion-permeable membrane does not tend to be distended into the solution path and form apertures between the membrane and the frame, through which the solution flowing from the conduits to the individual chamber could flow, and thus leakage between adjacent chambers is prevented. Accordingly, it is advantageous to use a frame A or B having a solution path with a form like that of any of FIGURES 6 to 10 combined with a frame having a solution path having the form of the solution path of FIGURE 12 or 13 and having narrow width and one or more bends.

In the solution path of FIGURES 12 and 13, the width of the solution path should generally be less than 5 mm., and the effective number of bends can be between one and seven, and each bend should be sharp and a radius of curvature of which is substantially zero. When there is a relatively great difference between the flow rates of the solutions supplied to or discharged from the concentrating chambers and the diluting chambers, it is advantageous to employ a combination of two kinds of frames which have different forms of solution paths.

The bends in the solution path are sharp, i.e., their radius of curvature is substantially zero. A solution path with such characteristics can stop the straight channeling which is apt to occur due to the uneven surface of the membranes between adjacent membranes and frames.

Usually the frames having the solution paths of FIGURES 12 and 13 which have a narrow width and more than one bend are used for feeding and discharging the solution which has the smaller flow rate (generally the solution of the concentrating chamber), while the frames having the solution paths of FIGURES 6 to 10 are used for the solution having a greater flow rate (generally the solution of the diluting chamber).

The following is an example of a method for the concentration of sea water which was carried out using an electrodialysis apparatus according to this invention.

250 selectively cation-permeable resin membranes 7 and 250 selectively anion-permeable resin membranes 8 each having an electrodialysis area of 100 dm.$^2$, 249 frames A of the form shown in FIGURE 3, 250 frames B of the form shown in FIGURE 4 and 499 spacers 17 cut in a shape so as to fit the electrodialysis area and represented by the cross-hatched portion in FIGURES 3 and 4, were assembled into a stack comprising 249 concentrating chambers and 250 diluting chambers having inter-membrane spacings of 0.75 mm. This stack was inserted between two feeding frames 5 and then placed between a cathode and an anode. The diluting stream, which was sea water, analysis $Cl^-$: 0.535 N, $SO_4^{--}$: 0.054 N, $Ca^{++}$: 0.020 N, $Mg^{++}$: 0.106 N, $K^+$: 0.0095 N, $Na^+$: 0.4535 N, was caused to flow through the diluting chambers at a flow rate of 180 liters per min. per 250 chambers, the flow flowing upwardly from the lower part of the dialysis apparatus through the diluting chambers, while the concentrating solution which was concentrated sea water having a chloride concentration of 3.90 N was caused to flow through the concentrating chambers at a flow rate of 25 l. per min. per 249 chambers. Simultaneously, a direct electric current of 350 amp. was passed through the apparatus. Desalted water having a chloride concentration of 0.27 N was collected from the upper part of the dilution chambers and discharged through the conduit 12. From the concentrating chambers 10, a concentrated solution having a chloride concentration of 3.90 N was recovered at the rate of 37 l. per min. through the conduit 14. Thus at an electrical efficiency of 86%, 720 l. of a 3.90 N concentrated liquid were produced per hour. No trouble was experienced during the continuous operation of such an apparatus in conveying out this process over a period of three months.

Another example of a method in which the apparatus according to the present invention was used was desalting of saline water having an analyses $Ca^{++}$: 27 p.p.m., $Mg^{++}$: 83 p.p.m., $Na^+$ 611 p.p.m., $SO_4^{--}$: 150 p.p.m., $Cl^-$: 1130 p.p.m., total salts 2,000 p.p.m., to produce drinking water having an analysis $Ca^{++}$: 5 p.p.m., $Mg^{++}$: 14 p.p.m., $Na^+$: 129 p.p.m., $SO_4^{--}$: 34 p.p.m., $Cl^-$: 223 p.p.m, total salts 405 p.p.m.

The apparatus used in this method comprised two stages, each including a stack of membranes each having an electrodialysis area of 100 dm.$^2$. Into the diluting chambers 9 of the stack of the first stage consisting of 200 pairs of membranes, the saline water having 2000 p.p.m. salts was passed at a flow rate of 605 l. per min. per 200 chambers. The solution paths in the frames defining diluting chambers were those of FIGURE 6, and the solution paths in the frames defining the concentrating chambers were similar to that of FIGURE 13. Direct electric current of 100 amp. (i.e., an electric current density of 1.00 amp./dm.$^2$) was passed through the first stage and desalted water having salts in an amount of 900 p.p.m. was obtained. This desalted water was passed into the diluting chambers of the stack of the second stage consisting of 170 pairs of membranes and direct electric current of 53 amp. (i.e., an electric current density of 0.53 amp./dm.$^2$) was passed through the electrodialysis area of the second stage. Desalted water having salts in an amount of 405 p.p.m. which was suitable for drinking was continuously produced at the approximate rate of about 600 l. per min. The electrical efficiency was 91%.

In the apparatus according to the present invention, the selectively cation-permeable resin membranes which can be used include cation exchange resin membranes having an ion exchange group of $—SO_3H$ and/or —COOH, and cation permeable amphoteric ion exchange resin membranes having an ion exchange group of $—SO_3H$ and/or —COOH and $—NR_3$ (R being H or an alkyl radical), and the selectively anion permeable membranes which can be used include anion exchange resin membranes having an ion exchange group of $NR_3$ (R being H or an alkyl radical) and anion permeable amphoteric ion exchange resin membranes having an ion exchange group of $NR_3$ (R being H or an alkyl radical) and $—SO_3H$ and/or —COOH.

What is claimed is:

1. A multi-cell electrodialysis apparatus comprising a plurality of stacked alternate anion permeable membranes and cation permeable membranes, frames between each two adjacent membranes defining an electrodialysis chamber within the periphery of the frame and between the membranes, the chambers alternately being diluting and concentrating chambers through the stack, the peripheries of the membranes and frames having aligned holes therein forming supply and exhausting conduits for supplying and carrying away diluting and concentrating solutions from the stack, each frame having solution paths between the holes and chamber defined within the frame and providing communication only between diluting chambers and supply and exhaust conduits for the diluting solution and only between a concentrating chamber and the supply and exhaust conduits for the concentrating solution, a part of the frame between a hole and the electrodialysis chamber being cut away to form at least one of the solution paths for diluting solution and concentrating solution, and compressible porous spacers woven of chemical and water resistant fibers and each having a thickness prior to being positioned in said apparatus at least slightly greater than the thickness of the frame and having a thickness the same as the thickness of the frame when positioned in the apparatus and which will regain its original shape and thickness when removed from the apparatus, and there being at least one of said spacers in the center opening defining the electrodialysis chamber in each of the frames and extending into at least part of said at least one solution path and holding said membranes in spaced relationship.

2. An apparatus as claimed in claim 1 in which said at least one solution path is not less than 5 mm. wide and said spacer in said solution path extends into at least a part of the hole in the frame from which said solution path extends.

3. An apparatus as claimed in claim 1 in which the supply and exhaust conduits are on opposite sides of the stack.

4. An apparatus as claimed in claim 3 in which the solution conduits are positioned on the upper and lower sides of the stack so that the solutions flow vertically in both the concentrating and diluting chambers.

5. An apparatus as claimed in claim 4 in which the conduits for supplying concentrating solution and exhausting diluting solution are on the upper side of the apparatus and the conduits for supplying diluting solution and exhausting concentrating solution are on the lower side of the apparatus, whereby the solution flows downwardly in the concentrating chamber and upwardly in the diluting chambers.

6. An apparatus as claimed in claim 1 in which the conduits for the diluting solution and the conduits for the concentrating solution are positioned alternately in the apparatus.

7. An apparatus as claimed in claim 1 in which the conduits are at a pitch of less than 30 cm.

8. An apparatus as claimed in claim 1 in which the spacers are each of a bulky fabric woven of also water and chemical resistant fibers, the warp and weft fibers undulating between opposite faces of the fabric and the warp fibers being twisted together.

9. An apparatus according to claim 1, wherein the membranes, frames and spacers are held together in a stack by means of two fastening frames, the fastening frames being the two outside units of the stack and having holes perforated in their periphery.

10. An apparatus according to claim 1, wherein a plurality of stacks and more than two feeding frames are all positioned between an anode and a cathode.

References Cited by the Examiner

UNITED STATES PATENTS

| | | | |
|---|---|---|---|
| 2,758,083 | 8/1956 | Van Hoek et al. | 204—301 |
| 2,891,899 | 6/1959 | Mason et al. | 204—301 |
| 2,923,674 | 2/1960 | Kressman. | |
| 3,046,211 | 7/1962 | Tye | 204—301 |

JOHN H. MACK, *Primary Examiner.*

E. ZAGARELLA, *Assistant Examiner.*